(12) United States Patent
Orman et al.

(10) Patent No.: US 11,100,134 B2
(45) Date of Patent: Aug. 24, 2021

(54) IDENTITY MAPPING FOR CLOUD MIGRATIONS

(71) Applicant: Microsoft Technology Licensing, LLC, Redmond, WA (US)

(72) Inventors: Jerry Kane Orman, Goodyear, AZ (US); Seth Scruggs, St. Johns, FL (US); Balakrishnan Shanmugam, Redmond, WA (US); Shopen Patel, Snohomish, WA (US); Joel Tipke, Seattle, WA (US); Ulric Tyson Dihle, Seattle, WA (US); Nicholas Claunch, Everett, WA (US); Ralph Foster, Redmond, WA (US); Chrystal Danielle Comley, Bothell, WA (US); Daniel Ward, Renton, WA (US); Peter Theeuwen, Sammamish, WA (US); Jacob Orchard, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 636 days.

(21) Appl. No.: 15/623,865

(22) Filed: Jun. 15, 2017

(65) Prior Publication Data

US 2018/0268045 A1   Sep. 20, 2018

Related U.S. Application Data

(60) Provisional application No. 62/471,862, filed on Mar. 15, 2017.

(51) Int. Cl.
*G06F 16/00* (2019.01)
*G06F 16/27* (2019.01)
(Continued)

(52) U.S. Cl.
CPC .......... *G06F 16/275* (2019.01); *H04L 63/101* (2013.01); *H04L 67/10* (2013.01); *G06F 16/211* (2019.01)

(58) Field of Classification Search
CPC .... G06F 16/275; G06F 16/211; H04L 63/101; H04L 67/10
See application file for complete search history.

(56) References Cited

U.S. PATENT DOCUMENTS 8,108,912 B2   1/2012  Ferris
8,943,496 B2   1/2015  Faus et al.
(Continued)

FOREIGN PATENT DOCUMENTS

WO   2016178923 A1   11/2016

OTHER PUBLICATIONS

Kumar, Kiran, "Migrating an existing on-premise application to Windows Azure Cloud", In White Paper of Mindtree, Feb. 19, 2015, pp. 1-8.

(Continued)

*Primary Examiner* — Paul Kim
(74) *Attorney, Agent, or Firm* — Newport IP, LLC; Han Gim

(57) ABSTRACT

Representative embodiments disclose mechanisms for data and identity migration, such as from an on-premises environment to a cloud environment. The system comprises multiple data collectors, each tailored to collect data from a data source. In a representative example, data collectors for a source application, a source identity repository and a target identity repository are utilized. Once the data is collected, it is stored in a database and methods are used to identify correlations (i.e., matches) between the source application (Continued)

data, the source identity repository data and the target identity repository data. The correlations are memorialized and presented to a user for rationalization. The process is stateful so that prior decisions are remembered. Once the user is satisfied with the rationalization, the system exports files that are consumed by a migration process to perform the actual data migration.

18 Claims, 7 Drawing Sheets

(51) Int. Cl.
*H04L 29/06* (2006.01)
*H04L 29/08* (2006.01)
*G06F 16/21* (2019.01)

(56) References Cited

U.S. PATENT DOCUMENTS

| | | | |
|---|---|---|---|
| 2013/0061306 A1* | 3/2013 | Sinn | H04L 67/10 726/7 |
| 2014/0280365 A1 | 9/2014 | Krugmann et al. | |
| 2016/0142485 A1* | 5/2016 | Mitkar | G06F 16/128 707/681 |
| 2016/0269371 A1* | 9/2016 | Coimbatore | H04L 63/0281 |
| 2017/0308792 A1* | 10/2017 | Liang | G06N 20/00 |
| 2018/0167273 A1* | 6/2018 | Buzzetti | H04L 41/0806 |

OTHER PUBLICATIONS

Sabiri, et al., "Methods Migration from On-premise to Cloud", In IOSR Journal of Computer Engineering, vol. 17, Issue 2, Mar. 2015, pp. 58-65.

Kassner, Eduardo, "Migrate Your Customers' IT Environments to the Cloud", https://blogs.partner.microsoft.com/mpn/migrate-your-customers-it-environments-to-the-cloud/, Published on: Nov. 2, 2016, 6 pages.

"Migrate Application environment from On-Premises to Oracle Java Cloud Services", http://www.oracle.com/webfolder/technetwork/tutorials/obe/cloud/javaservice/JCS/JCS_AppToCloud/app2cloud_sample.html, Retrieved on: Feb. 27, 2017, 2 pages.

Varia, Jinesh, "Migrating your Existing Applications to the AWS Cloud", In White paper of Amazon Web Services, Oct. 2010, 23 pages.

Rabetski, et al., "Migration of an on-premise application to the Cloud: Experience report", In Proceedings of Second European Conference, Sep. 11, 2013, pp. 1-15.

Pahl, et al., "A Comparison of On-premise to Cloud Migration Approaches", In Proceedings of Second European Conference, Sep. 11, 2013, pp. 1-15.

"Moving Critical Apps to the Cloud with Confidence", https://interact.f5.com/2016ALLPGoogleCloudMigrationAPAC_2-Registrationpage.html?gclid=CjwKEAiA3NTFBRDKheuO6IG43VQSJAA74F77keQKQvnWQS5yc12Kiu9xnd-Nj9X_vrQfin-UvxwDZxoCGibw_wcB, Retrieved on: Feb. 27, 2017, 3 pages.

"Application Migration to On-Premises Cloud", https://h20195.www2.hpe.com/V2/getpdf.aspx/4AA6-3932ENW.pdf?ver=1.0, Published on: Feb. 2016, 8 pages.

* cited by examiner

IDENTITY MAPPING FOR CLOUD MIGRATIONS

FIELD

This application relates generally to migration of identities between local and cloud systems. More specifically, embodiments disclosed herein include identity migration technologies to migrate identity and other data from local systems to cloud systems.

BACKGROUND

Migration from an on premises environment to a cloud environment involves converting on premises identity data to identity data suitable for use in the cloud environment. As the on premises environment and cloud environment often comprise very different identity and security models, the process is usually accompanied by several difficult issues that must be solved and overcome to successfully migrate to the cloud environment. However, existing tools and approaches result in several issues that only become apparent once the migration is attempted and usually require fixup after migration to get things running.

It is within this context that the present embodiments arise.

DETAILED DESCRIPTION

Figure 1:
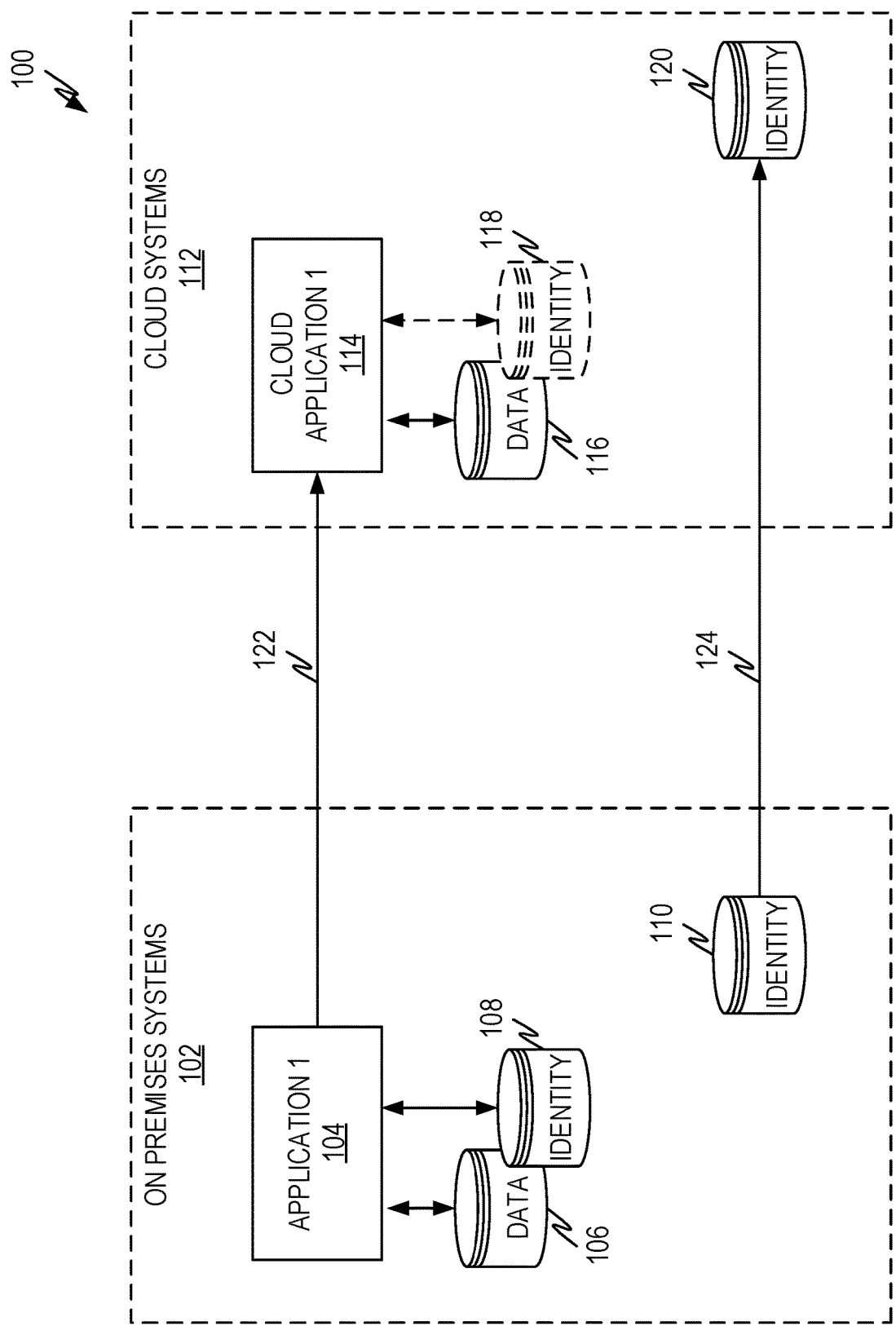
FIG. 1 illustrates an example of migration from an on premises environment to a cloud environment.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments of the present disclosure target the problems that occur during migration from an on premises environment to a cloud environment. Prior approaches to migration perform guesses on how to match on premise identity data to cloud identity data based on attributes of a user. The resulting processes are inconsistent in their results and often require fixup after migration to get things running. Furthermore, as these processes often work in real time, users responsible for the migration (i.e., system administrators and others) often cannot tell the results of the migration until migration is attempted. Thus, several attempts may be required to get a completed migration.

In order to provide complete mapping information, the embodiments disclosed herein utilize specialized data collectors to collect information about identity and other data to be migrated from both source on premise locations and from target cloud locations. The system comprises data structures and database schema to store the collected information. Once the information is collected, correlation algorithms can be employed to identify potential matches between the data. The matching processes identify both instances where identity and other information can be matched between source and target data as well as instances where sources exists without corresponding targets and targets exist without corresponding sources.

Users can view the matches and non-matches identified and the system can present the implications of the matches/non-matches to a system administrator or other authorized users. The reporting functionality allows authorized users to assess whether the migration can be successfully completed and uncover migration problems before migration is attempted. Editing tools allow authorized users to edit mappings/non-mappings and/or mark the mappings/non-mappings as approved. The process is stateful so that once a mapping/non-mapping is considered, the system will retain the decisions made through subsequent iterations of the processes.

Once an authorized user is satisfied with the status of the mapping, the system can create migration files that are subsequently consumed by a migration tool to implement the decisions made by the authorized user.

In representative examples, three data collectors are utilized to collect information from source applications, source environment systems and target environment systems. Correlation between the source application, source environment and target environment is performed to create a mapping that will be accomplished. Mapping between the source application, source environment and target environment can be accomplished through a unique identifier, if available, or through sophisticated mapping, correlation and analysis algorithms.

Description

FIG. 1 illustrates an example 100 of migration from an on premises environment 102 to a cloud environment 112. The on premises environment 102 can comprise an application 104 with data 106 and/or identities 108 that will be migrated to a corresponding application 114 with data 116 and/or identities 118 in the cloud environment 112. The cloud environment may be off premises or may be an on premise cloud solution. This the term on premise and cloud are representative of the types of migration that may occur. The on premises application 104 can be any application with data 106 and/or identity information 108 to be migrated to the cloud environment 112.

Line of business applications that reside on premises 102 often have user profiles, group information and other such identity information that are used to specify who is authorized to utilize the application 104, data associated with an authorized user and/or group and/or other information. Thus, identity information 108 can comprise user profile information, group profile information, and/or other related information.

The data information 106 may comprise any information that should be migrated as part of the migration. For example, if the application 104 is a data sharing application, the data 104 can comprise the shared data to be migrated.

Identity information 108 may be migrated to equivalent information in identity information 118 in some embodiments. In other embodiments, however, cloud application 114 may rely on the security infrastructure of the cloud systems 112 (i.e., identity information 120). Thus, identity information 118 is shown in dashed lines to illustrate that depending on the environments, the applications and so forth, such data may or may not need to be migrated.

Often, security information provided by the on premises infrastructure is utilized to protect the application 104 from unauthorized use. For example Access Control Lists (ACLs) and other permission objects and/or security infrastructure provided by the on premises systems 102 can be used to control access to the application 104, to authenticate/authorize a user to access the application 104 and/or for other purposes. Thus, the identity information 110 that is part of the on premises systems 102 may also be migrated as part of the migration process (i.e., migrate them to identity information 120).

The migration process often requires mapping one type of security and identity infrastructure to a totally different security and identity infrastructure. For example, identities associated with an on premise system 102 may have a completely different format than identities associated with the target cloud system 112. The security infrastructure for the on premises systems 102 may also have a different format, may operate differently, and/or have other differences from the cloud systems 112. Thus, migration of identity information 110 to identity information 120 may comprise mapping fields from one type to another as described below. Similar situations may occur as other information is migrated (i.e., data 106 to data 116, identity information 108 to identity information 118, etc.).

Figure 2:
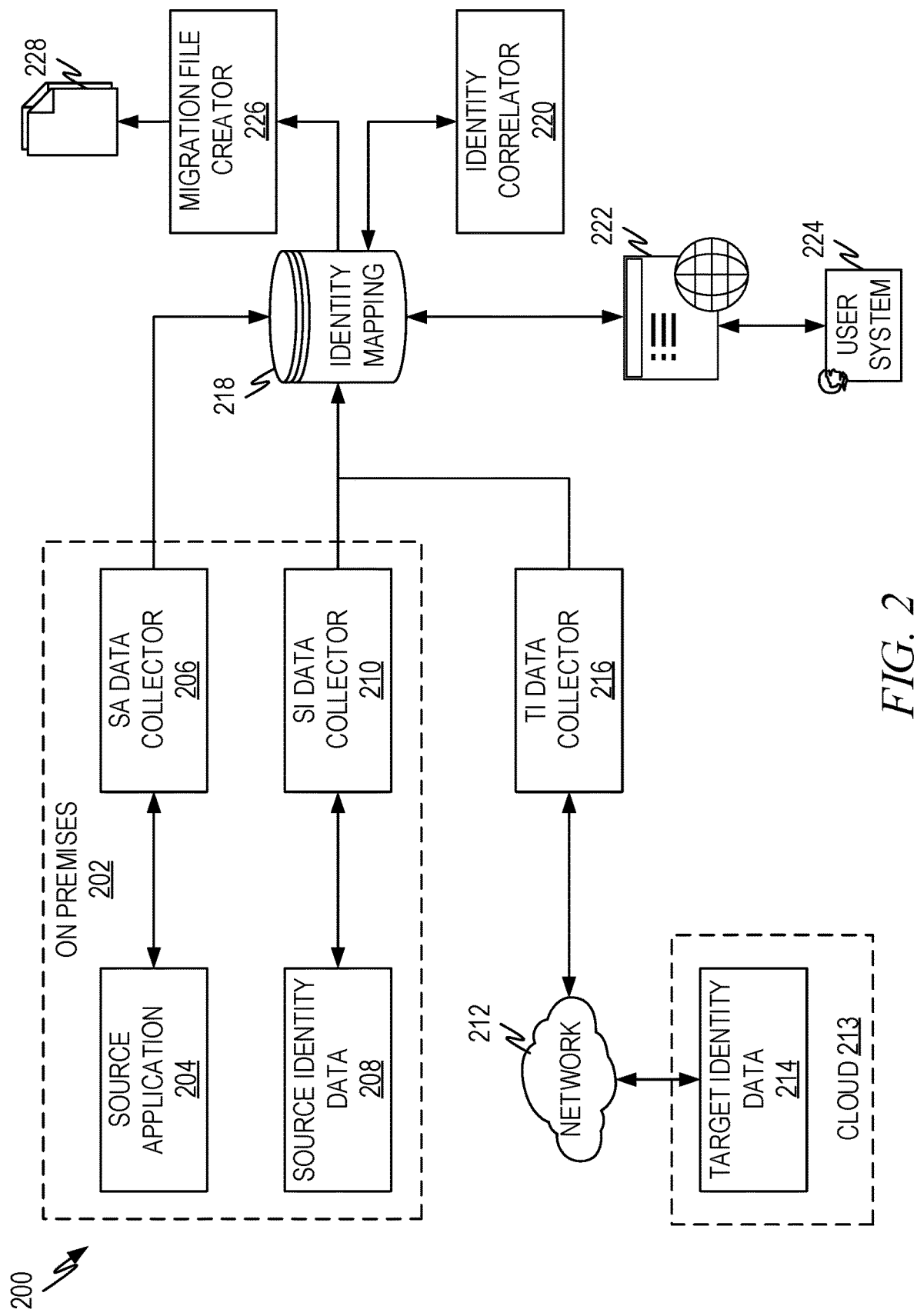
FIG. 2 illustrates an example architecture according to aspects of the disclosure.

FIG. 2 illustrates an example architecture 200 according to aspects of the disclosure. In this example, the on premises systems 202 have two sources of data that are to be used to draw from and the cloud systems 213 have one data target. The data sources comprise data from the source application 204 and data from the infrastructure, i.e., source identity data 208. The data target comprises target identity data 214.

The architecture employs data collectors tailored to collect data from each of the data sources and data targets. Thus, source application data collector 206 collects data from source application 204. Source identity data collector 210 collects data from source identity data systems/stores 208. Target identity data collector 216 collects data from target identity data systems/stores 214. The data collectors can be programmed to collect all data from the respective data source/target or can be programmed to collect data that will be of interest. For example, if the primary goal is to migrate the application (i.e., source application 204) to the cloud, then the information and identities associated with the source application 204 set the bounds of what needs to be migrated.

Often when an application, etc. is migrated to a new environment, not everything in the new application needs to be migrated. In other words, system administrators and/or other authorized users in charge of the migration take the opportunity of the migration to perform an evaluation to see what should be migrated and what does not need to be migrated. Thus, assuming that the source application 204 is to be migrated, the migration set (i.e., the set of data and/or identities that are to be migrated) can be all or less than all of the data and/or identities associated with source application 204 and information that may correlate with that data from other data sources/targets (i.e., source identity data 208 and target identity data 214 in the example of FIG. 2). Therefore, in some embodiments, the primary purpose of the migration (e.g., migrating the source application 204) can be used to set the bounds of information that is collected from each source and/or target. In other words, information that has little or no potential to correlate with information from the source application 204 need not be collected. As a representative example, if the source application only has users from a facility and/or geographic region, identities (i.e., source identity data 208) from other facilities and/or geographic regions need not be collected. In other embodiments, since it can be difficult to know what from other data sources/targets may correlate with data from the primary purpose of the migration, all data can be collected.

Source application data collector 206 collects information to be migrated from the source application. For example, the information collected can comprise user profile information, data ownership information and/or other such information. Users of the source application 204 can be individuals and/or groups. For example, groups of users are often granted access as a group (rather than individuals) in many scenarios. As used herein, users can refer to an individual user or a group, unless otherwise specified. Users and/or groups often have ownership of data that is to be migrated. For example, source applications that are document management systems, data sharing systems, databases and other applications that include data owned by groups and/or users can have data to be migrated. In these type of scenarios, when a user is migrated, the data owned by the user should also be migrated. Thus, collecting information not only about the identity of a user but also ancillary or owned data that should be migrated along with the identity. Permissions associated with a user can also be migrated with the user.

The source identity data collector 210 collects information from source infrastructure resources that help identify users and can help map user data collected by the source application data collector to information collected by the target identity data collector 216. As a representative example, in a Windows® environment, Active Directory® is a broad range of directory-based identity-related services. For example, Active Directory Domain Services® can store information about members of a domain, including devices and users, verify user credentials, define user access rights and so forth. This information can be extracted for different domains (e.g., source identity data 208) by the source identity data collector 210. Other environments also have identity information in repositories that can be extracted by an appropriate source identity data collector 210.

Target identity data collector 216 collects information from target infrastructure resources (e.g., target identity data 214). The target identity data collected by target identity data collector 216 will often be in a different format and have different fields than that collected, for example, by the source identity data collector 210. Thus, the correlation performed will take into account the different formats, as described in greater detail below.

The data collected by source application data collector 206, source identity data collector 210 and target identity data collector 216 is stored in a data store, such as identity mapping data store 218. The identity mapping data store 218 comprises a schema for how the different data is stored. A representative schema is discussed below.

Although the architecture of FIG. 2 illustrates three data collectors, different embodiments may have more or fewer data collectors. This may be because there are more/fewer data sources or because a single data collector can collect data from more than one source. Tailoring the data collectors to the particular data source allows the data collector to be lightweight.

As described above, the data collectors can be programmed to collect all data from the respective data source or can be more limited to collect data that is likely to yield a match to data that is to be migrated. In either case, the primary target of the migration (i.e., the source application) can also collect data that will not be migrated so the user(s) in charge of the migration can get a clear picture of the impact of the migration as discussed in greater detail below.

The identity correlator 220 correlates the data collected and stored in identity mapping data store 218 to identify how the identities and/or data collected will be mapped during the migration. The result of this correlation will highlight identities and/or data that has a correspondence in the target infrastructure as well as identities and/or data that has no correspondence in either the source or target infrastructure. As examples only: 1) an on-premises identity may find a match in the target system(s); 2) an on-premises identity may find no match in the target system(s); and/or 3) a target system identity may find no match in the source system(s). With three sources of data, the possibilities for correlations and/or missing correlations expand, although some of the combinations would indicate errors of one type or another. Method for the identity correlator 220 are discussed in greater detail below.

The data collection and/or correlation aspects described above can be performed one time or several times. However, decisions that were previously made by the user (see discussion below) are maintained so that an authorized user need only make the decision once. For example, suppose the data collection and correlation processes indicates that a set of on premises identities find no match on the target system. The authorized user indicates that the set of on premises identities with no match should not be migrated (hence skipped). If the data collection and correlation process is re-run, the system will again identify the same set of on premises identities has no match on the target system (assuming no change on the target system). In this situation, the migration system should remember that the decision for the set of on premises identities had previously been made and not ask for the authorized user to make the same decision again. Thus, decisions made should be stateful, so that previously made decisions are carried over when the collection/migration processes are re-run.

The migration system allows a user to explore and make decisions regarding the correlations among the collected data. This is illustrated by 222, which shows reporting, editing, exporting/importing and/or other services that allow an authorized user 224 to ascertain the impact of collected data and identified correlations. The services of 222 are discussed in greater detail below.

Once the authorized users are satisfied with the mappings made and with the migration that will occur, the authorized use can create a set of migration files 228 (e.g., through the migration file creator process 226) that can be consumed by a migration program that performs the actual data migration. The migration files 228 can comprise information that allows the migration program to perform the mappings for information that should be migrated and skip the information that should not be migrated. The files can be of any suitable interchange format, such as comma separated value files. The migration files 228 can comprise one or more files, depending on the embodiment. The files comprise information to allow proper migration of the identities and data that is migrated as part of the process, and identifies objects/identities/data that are skipped (i.e., not migrated).

Figure 3:
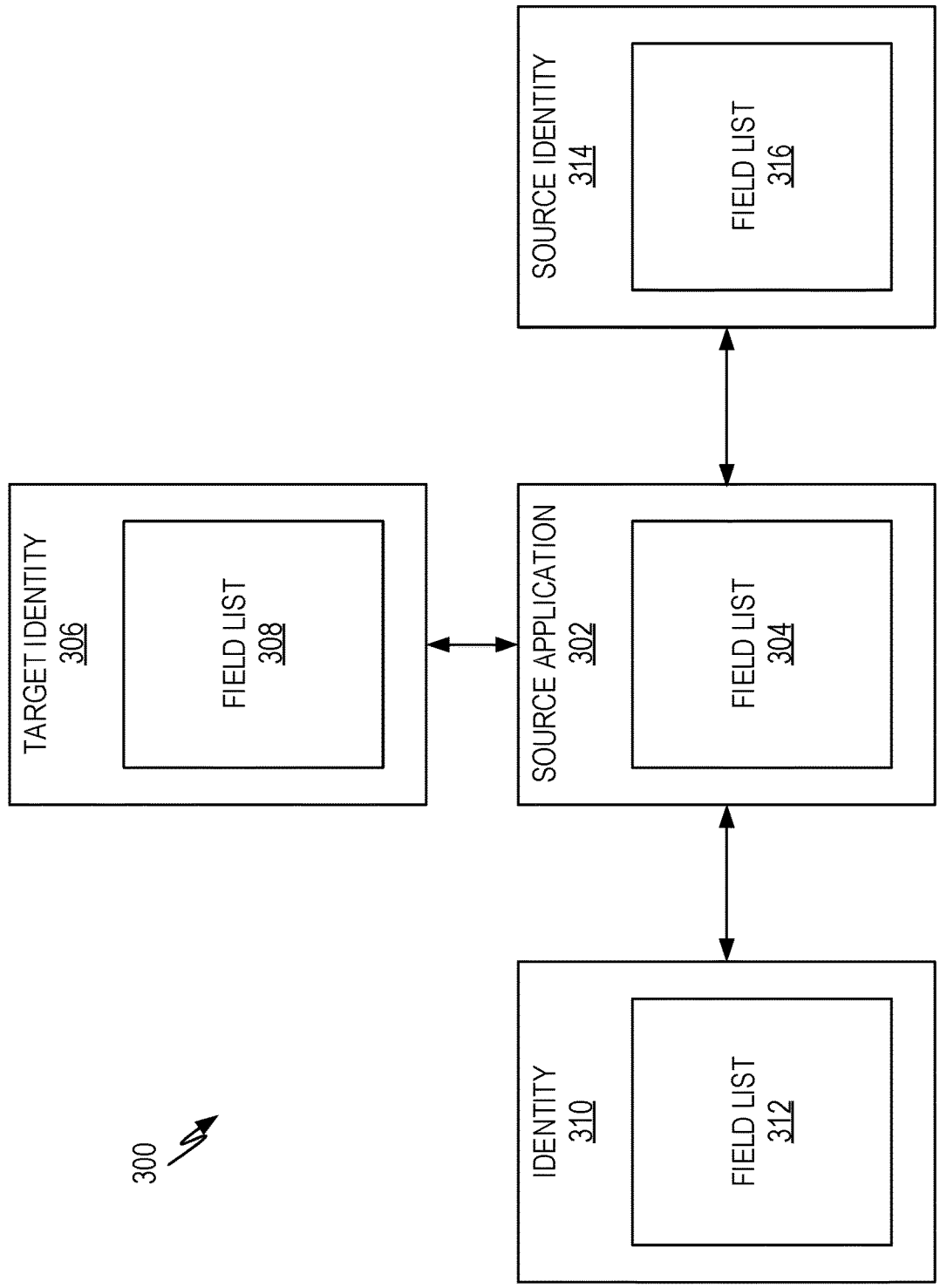
FIG. 3 illustrates an example database schema according to aspects of the disclosure.

FIG. 3 illustrates an example database schema 300 according to aspects of the disclosure. In this schema, three sources of data are illustrated (source application data, source identity data and target identity data), however, other embodiments may have more or fewer sources of data in the schema. The representative example of FIG. 3 illustrates an example of the data that is collected by source application data collector 206, source identity data collector 210, and target identity data collector 216. In other scenarios and embodiments, different data fields can be collected.

The center table, source application table 302 represents the primary purpose of the migration. In this example, the source application (e.g., source application 204) is to be migrated from on premise to cloud. Thus, data from the other data collectors are correlated to the data in the source application table 302. The other tables, target identity table 306, source identity table 314 are correlated to and have a relationship with, the source application table 302 when correlations are found among the data from the different sources.

Source application table 302 comprises a plurality of fields, 304, which comprise all or part of the data collected by source application data collector (i.e., 206 of FIG. 2). In one representative embodiment, the data fields 304 of the source application table 302 comprise one or more of:

UniqueID: the primary key for identities. For internal users, the UniqueID is a security ID used by the system (e.g., a security identifier (SID)). For external users, it can be an external identifier such as a Security Assertion Markup Language (SAML) claim.

IsGroup: a field that indicates whether the identity is a group or an individual user. Can be derived from other information collected by the data collector.

DataExists: a field that indicates whether the user owns data (i.e., in the source application) that should be migrated. For example, the field can be true if the user owns data and false otherwise. In a data sharing or document management system this can be the data, page, etc. that is owned by the user.

ProfileExists: a field that indicates whether a user profile exists (i.e., in the source application) that should be migrated. For example, the field can be true if the user has a user profile and false otherwise.

ACLExists: a field that indicated whether an ACL exists (i.e., that is used by the source application) for the user that should be migrated. For example, the field can be true if the user has an associated ACL and false otherwise.

LoginName: the login name of the user for the source application. This field can be used to match login names in the source identity information and/or target identity information if the user cannot be identified by the UniqueID.

IsExternal: a field that identifies whether the object is an external user/group. For example, the field can be true if the user is external and false otherwise.

Created: the date that the entry was created in the database. Useful for knowing when the record was created in the database, e.g., so authorized users can identify when the identity first entered the database.

Updated: the date that the entry is last updated. Useful for knowing when the record was last updated in the database, e.g., so authorized users can identify when the identity was last pulled from the source application.

Source identity table 314 comprises a plurality of fields, 316, which comprise all or part of the data collected by source identity data collector (i.e., 210 of FIG. 2). In one representative embodiment, the data fields 316 of the source identity table 316 comprise one or more of:

UniqueID: this field comprises a unique identifier such as a security identifier of the object (i.e., identity information) retrieved from the on premises systems. For internal users, the UniqueID is a security ID used by the system (e.g., a security identifier (SID)). For external users, it can be an external identifier such as a Security Assertion Markup Language (SAML) claim.

DisplayName: this field comprises a display name for an object (i.e., identity information) retrieved from the on premises systems. For example, in a Windows® Active Directory® object, this name is usually a combination of a user's first name, middle name and/or last name.

ObjectType: this field comprises the type of object retrieved, such as whether it is a user, group, and so forth.

GroupType: if the ObjectType indicates the object is a group, this field comprises the type of group the object represents. Examples include a security group, a distribution group, and so forth.

GroupMemberCount: if the ObjectType is a group, this field comprises the number of members in the group.

DistinguishedName: this field comprises the distinguished name for the object. A distinguished name comprises a sequence of relative distinguished names with a separator (such as a comma) between them. A relative distinguished name is an attribute with an associated value, such as attribute=value. Relative distinguished names can comprise different attributes depending on the environment and/or embodiment (e.g., on premises systems, embodiment, etc.). In one example, relative distinguished names comprise: DC—a domain component name; CN—a common name; OU—an organizational unit name; O—an organization name; STREET—a street address; L—a locality name; ST—a state or province name; C—a country name; UID—a user identifier. Not all relative distinguished name attributes need be found in each distinguished name. For example, a distinguished name could be: CN=Jeff Smith,OU=Sales,O=Contosco, DC=Fabrikam,DC=COM.

UserAccountState: this field comprises a value that indicates whether an account is enabled or disabled.

LastLoginTime: this field comprises a value indicating the last login time for the account.

FoundInIdentityStore: this field indicates whether the account was found or not. For example, the value can be true if the account was found and false otherwise.

ReasonNotFound: this field can indicate a reason why an account was not found. For example, the field can comprise a value indicating: the system was unable to connect, the system detected an invalid parameter, the system could not find the account associated with a SID, and so forth.

Created: the date that the entry was created in the database. Useful for knowing when the record was created in the database, e.g., so authorized users can identify when the identity first entered the database.

Updated: the date that the entry is last updated. Useful for knowing when the record was last updated in the database, e.g., so authorized users can identify when the identity was last pulled from the source application.

Target identity table 306 comprises a plurality of fields, 308, which comprise all or part of the data collected by target identity data collector (i.e., 216 of FIG. 2). In one representative embodiment, the data fields 308 of the target identity table 306 comprise one or more of:

UniqueID: this field comprises a unique identifier such as a security identifier of the object (i.e., identity information) retrieved from the target systems. For internal users, the UniqueID is a security ID used by the system (e.g., a security identifier (SID)). For external users, it can be an external identifier such as a Security Assertion Markup Language (SAML) claim.

FoundInTargetStore: this field comprises a value that indicated whether the account was found or not. For example, the value can be true if found and false otherwise.

ReasonNotFound: this field can indicate a reason why an account was not found. For example, the field can comprise a value indicating: the system was unable to connect, the system detected an invalid parameter, the system could not find the account associated with a SID, the target system didn't trust the connector to connect, and so forth.

ObjectID: this field comprises an identifier value for the object in the target system.

UserPrincipleName: this field comprises a value that indicates the name of the object. For example user@companyname.com or whatever format is used by the target system.

GroupName: this field comprises a name for a group in the target system.

Created: the date that the entry was created in the database. Useful for knowing when the record was created in the database, e.g., so authorized users can identify when the identity first entered the database.

Updated: the date that the entry is last updated. Useful for knowing when the record was last updated in the database, e.g., so authorized users can identify when the identity was last pulled from the source application.

Identity table 310 comprises a plurality of fields, 312, which comprise data that indicates information related to correlations made by the system, decisions made by an authorized user and so forth. In one representative embodiment, the data fields 312 of the target identity table 310 comprise one or more of:

UniqueID: this field comprises a security identifier of the object (i.e., identity information) retrieved from the target systems. For internal users, the UniqueID is a security ID used by the system (e.g., a security identifier (SID)). For external users, it can be an external identifier such as a Security Assertion Markup Language (SAML) claim.

IsGroup: this field comprises a value that indicates if the identify is a group. For example, the value can be true if the identity is a group and false otherwise.

IsExternal: this field comprises a value that indicates if the identity is external (i.e., to the source application). For example, the value can be true if the identity is external and false otherwise.

IsMapped: this field comprises a value that indicates whether the identities have been correlated or not (i.e., by identity correlator 220 and/or edited by an authorized user). For example, the value can be true if the identities have been correlated and false otherwise.

CustomerAck: this field comprises a value that indicates whether an authorized user has acknowledged the correlation, such as by reviewing, approving, and/or otherwise. For example, this field can be true if the customer has acknowledged the correlation and false otherwise. This field can be used to identify whether or not to present the correlation to an authorized user.

CustomerAckDate: this field comprises a value that indicates the date of acknowledgement by the customer.

CustomerAckReason: this field comprises a value where an authorized user can indicate a reason for acknowledging the mapping. This field can comprise a selection of choices or can be freeform (i.e., text) or any combination thereof.

Created: the date that the entry was created in the database. Useful for knowing when the record was created in the database, e.g., so authorized users can identify when the identity first entered the database.

Updated: the date that the entry is last updated. Useful for knowing when the record was last updated in the database, e.g., so authorized users can identify when the identity was last pulled from the source application.

In the tables of FIG. 3, the different field lists can comprise one or more database key fields. For example the UniqueID field can be used as a key in some embodiments.

The overall process to correlate information from the multiple sources from which it is collected is to first correlate the primary reason for the migration (i.e., the source application) with data from the other sources (i.e., the source identity and target identity systems in the embodiment of FIG. 2). The methods of FIGS. 4 and 5 illustrate one way that the matching can be performed.

Since the information is collected and resides in a database (i.e., identity mapping data store 218 for the embodiment of FIG. 2), the matching/correlation methods can be sophisticated since they do not need to be performed in real time. Thus, all collected fields can be examined for correlation and based on the fields and the values, sophisticated models can be used that present the probability of correlation. The probability can then be subject to a threshold and a decision made on whether to declare the data correlated or not correlated.

On the other end of the spectrum, if the same unique identifier exists for data from different sources, correlation can be declared based on the matching of the unique identifier. For example, if a SID, SAML, or other identifier match, then due to the way that these identifiers are assigned, correlation can be declared.

Figure 4:
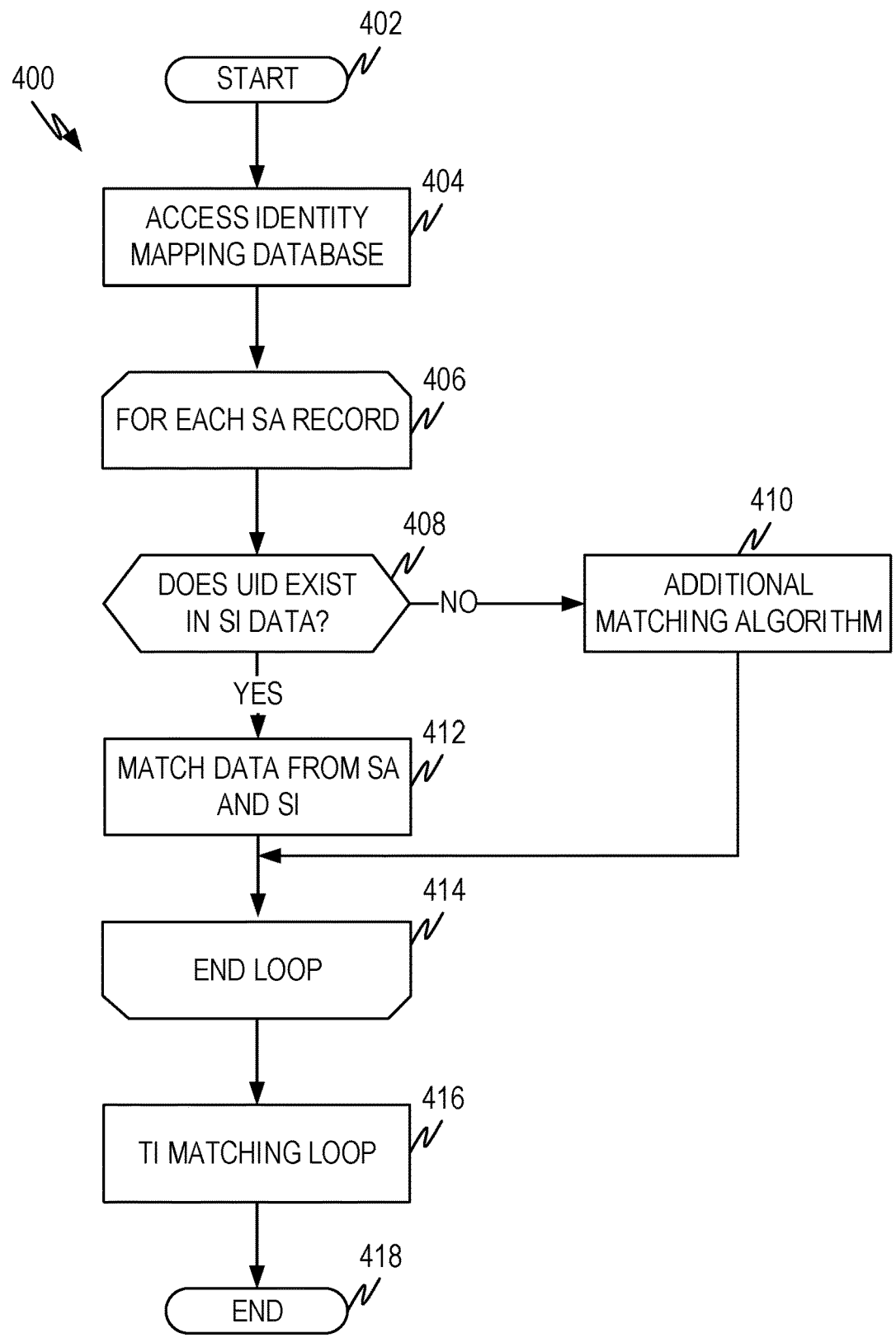
FIG. 4 illustrates a flow diagram for mapping between source application and source identity data.
Figure 5:
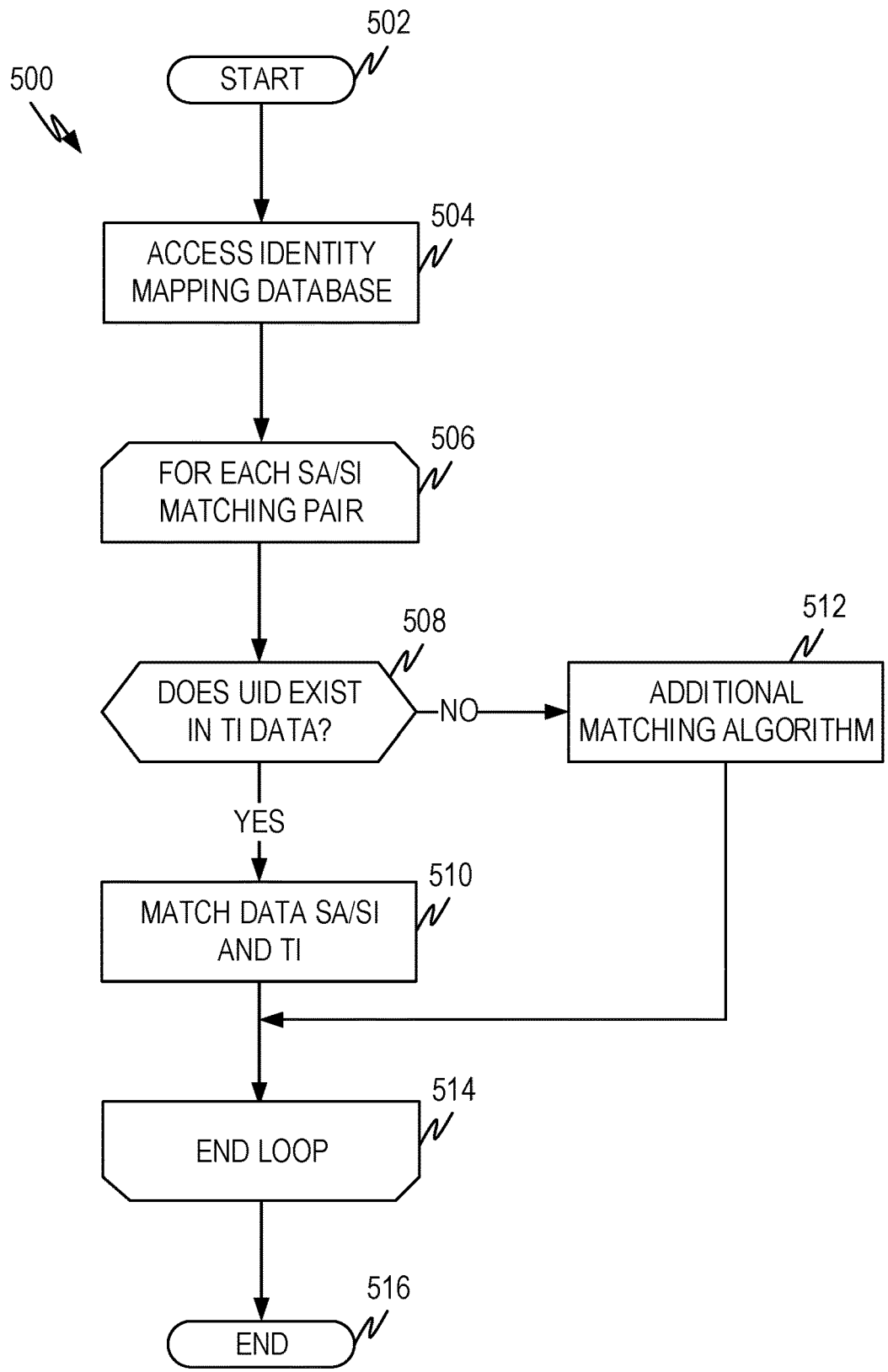
FIG. 5 illustrates a flow diagram for mapping between source application/source identity data and target identity data.

The methods of FIGS. 4 and 5 illustrate an example of how these methods can be used.

FIG. 4 illustrates a flow diagram 400 for mapping between source application data and source identity data. In this method, a loop is used to test the matching of identifiers, fields, and so forth. However, alternative constructs can be used such as parallel retrieval and testing of fields.

The method begins at operation 402 and proceeds to operation 404 where the appropriate information is retrieved from the identity mapping database. Operations 406, 408, 410, 412 and 414 form the loop previously discussed and loops over all source application records that have not previously been correlated.

Operation 408 tests to see whether a unique ID exists for the source application record and for the source identity record. If so, then correlation can be based on a matching of the unique ID associated with the source identity record and the unique ID associated with the source application record.

Thus, execution proceeds to operation 412 where, if the unique IDs match, correlation is declared. Correlation is memorialized, for example, by matching the records as described above in the data tables of FIG. 3. Thus, the Unique ID (i.e., SID or other unique ID) can be a used as a key that matches the appropriate records of the source application table 302 and the source identity table 314. Furthermore, the corresponding record in the identity table 310 can be created.

If a unique ID does not exist for the source application record and for the source identity record that ties the two records together (i.e., by using the unique ID as the key), since either the unique ID does not match or because one record or the other does not have a corresponding unique ID, execution proceeds to operation 410 where an additional matching algorithm is used to identify whether the two records should be correlated. As described above, other matching algorithms may evaluate the fields in the records to determine whether a match occurs. For example, if the fields are as illustrated above, the source application fields can include information such as LoginName or other profile information. This LoginName can be compared, for example, to the DisplayName, DistingushedName (i.e., one or more relative distinguished name values of the DistinguishedName), or other appropriate fields. The degree of matching between the different fields can be used to derive how likely it is that the two records should be correlated.

Algorithms to determine the degree of matching between two strings are known and any such algorithms can be used as part of operation 410. Once the degree of match is derived, the degree of match can be converted to a probability, either by a direct mapping between the degree of match and a probability in the range of 0-1 or taking into account other matching fields, such as whether both are groups or individuals, whether the account state is as expected, and other such matches/characteristics.

The result of operation 410 would be to either declare a match (e.g., based on comparing a probability of match to a threshold value, or other logic using the fields of the records) and memorialize that by ensuring the key filed (i.e., UniqueID) have the same value, creating a corresponding identity record in the identity table with appropriate fields, and so forth.

Operation 414 ends the loop so that all source application records can be compared to source identity records to identify all matches. Previously matched records can be double checked or can be skipped as part of the loop.

Execution then proceeds to operation 416 where the matched source application and source identity records are compared to the target identity records to identify matches between SA/SI record pairs and TI records. This process is described in greater detail as part of FIG. 5.

Execution ends at operation 418.

FIG. 5 illustrates a flow diagram 500 for mapping between source application/source identity data and target identity data. In this method, a loop is used to test the matching of identifiers, fields, and so forth. However, alternative constructs can be used such as parallel retrieval and testing of fields.

The method begins at operation 502 and proceeds to operation 504 where the appropriate information is retrieved from the identity mapping database. Operations 506, 508, 510, 512 and 514 form the loop previously discussed and loops over all source application records that have not previously been correlated.

Operation 508 tests to see whether a unique ID exists for the source application record/source identity record pair and for the target identity under consideration. If so, then correlation can be based on a matching of the unique ID associated with the source identity record/source application record pair and the unique ID associated with the target identity record. Thus, execution proceeds to operation 510 where, if the unique IDs match, correlation is declared. Correlation is memorialized, for example, by matching the records as described above in the data tables of FIG. 3. Thus, the Unique ID (i.e., SID or other unique ID) can be a used as a key that matches the appropriate records of the source application table 302, the source identity table 314 and the target identity table 306. Furthermore, the corresponding record in the identity table 310 can be created, if it had not been previously created and/or updated as appropriate.

If a unique ID does not exist for the target identity record that ties the records together (i.e., by using the unique ID as the key), since either the unique ID does not match or because one record or the other does not have a corresponding unique ID, execution proceeds to operation 512 where an additional matching algorithm is used to identify whether the target identity record should be correlated to the source application/source identity pair. As described above, other matching algorithms may evaluate the fields in the records to determine whether a match occurs. For example, if the fields are as illustrated above, the source application fields can include information such as LoginName or other profile information. The source identity fields can include the DisplayName, DistingushedName (i.e., one or more relative distinguished name values of the DistinguishedName), or other appropriate fields. These can be compared, for example, to the UserPrincipleName, GroupName, and/or other fields. The degree of matching between the different fields can be used to derive how likely it is that the two records should be correlated.

Algorithms to determine the degree of matching between two strings are known and any such algorithms can be used as part of operation 512. Once the degree of match is derived, the degree of match can be converted to a probability, either by a direct mapping between the degree of match and a probability in the range of 0-1 or taking into account other matching fields, such as whether both are groups or individuals, whether the account state is as expected, and other such matches/characteristics.

The result of operation 512 would be to either declare a match (e.g., based on comparing a probability of match to a threshold value, or other logic using the fields of the records) and memorialize that by ensuring the key filed (i.e., UniqueID) have the same value, creating a corresponding identify record in the identity table with appropriate fields, and so forth.

Operation 514 ends the loop so that all source application records can be compared to source identity records to identify all matches. Previously matched records can be double checked or can be skipped as part of the loop.

Execution ends at operation 516.

Figure 6:
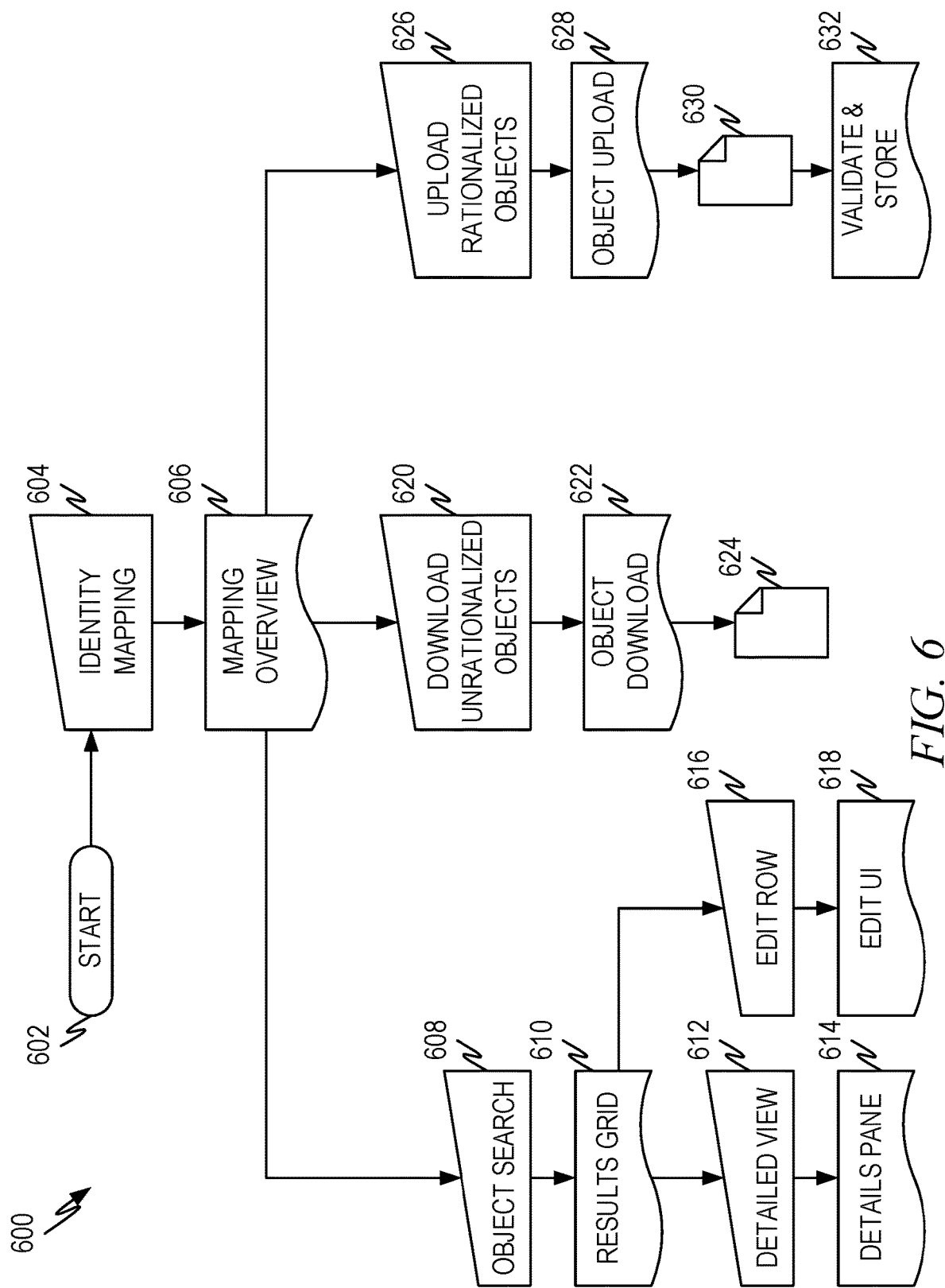
FIG. 6 illustrates a representative user interface flow diagram according to aspects of the disclosure.

FIG. 6 illustrates a representative user interface flow diagram 600 according to aspects of the disclosure. This diagram presents a representative example of the various user interfaces and associated functionality that can be presented to an authorized user(s) to allow an authorized user(s) to see the impact of the mapping that has been uncovered by the system and prior decisions made by the authorized user(s).

The diagram starts with operation 602 where a landing page that has appropriate navigation links and/or other information can be presented to a user. From that page, the user can navigate to a mapping overview page 606 such as by clicking on an appropriate navigation link as illustrated by operation 604.

The mapping overview page 606 can provide the ability of an authorized user to see an overview of identity mapping information, see how fresh the data is (i.e., the last time the mapping data was collected and/or correlated), identify objects that are unmapped and rationalize (i.e., make decisions about them), and allow users to make edits and provide mapping information. These can be provided by appropriate navigation links (i.e., to further functionality) as well as presenting particular information that allows the authorized user to see the current state and status of the mapping.

In a representative example, the mapping overview page 606 can have a table or other format to present the number of mapped, number of unrationalized (i.e., decisions have yet to be made/confirmed), number of users (both internal and external), number of groups (both internal and external), and so forth. For example, a table such as that below can be presented:

| | Number Unmapped | Number Unrationalized | Total |
|---|---|---|---|
| Users | | | |
| Groups | | | |
| External Users | | | |
| External Groups | | | |

In addition, the page can comprise one or more of:
information about when the various data sources (i.e., source application, source identity, and target identity) data was refreshed.
A search box
A grid presenting a portion of the objects to be mapped and/or rationalized. Such a grid can comprise, for example, one or more of the following as columns in the grid:
LoginName
UniqueID
IsMapped
IsExternal
IsGroup
Found (i.e., in the source identity data source)
Found (i.e., in the target identity data source)

Hovering over a row in the grid could display an identity detail popup (or otherwise display the detail of the identity in the row). The identity detail information could show all the information collected for that identity. Presenting the grid and detail popup can enable the authorized user to spot check objects that have been identified and/or rationalized.

In addition, the mapping overview page 606 can allow authorized users to produce detailed reports that describe any of the desired information. For example, a report showing the unrationalized and/or unmapped objects can be created and viewed/printed. This reporting feature is not further shown or discussed in FIG. 6, but such reporting functionality can allow reports to be created that select data based on any of the fields in the tables and criteria related thereto.

The mapping overview page 606 can also allow the user to navigate to other pages that provide further functionality, such as presenting the results of a particular search, downloading unmapped/unrationalized objects, uploading mapped/rationalized objects, etc.

For example, the user can enter a search (i.e., in the previously describe search box), construct a search from a query builder, and/or click on a link to navigate to a page that allows further editing of the information or rationalizing the mappings. Thus, operation 608 shows that a user can enter/build or otherwise select a set of records to view and the results grid can be presented in a results grid page 610. The grid can include any of the fields discussed above.

From the results grid, the user can either indicate that more detail is desired (e.g., by hovering over a row, clicking on a row, making a selection, etc.) and the detailed information can be presented in a detail pane, popup, etc. as shown by 614.

A user can also indicate a desire to edit a row, such as to rationalize mappings made and so forth. This is indicated by input operation 616 and page 618, which would present an appropriate edit user interface. As noted elsewhere edits and other decisions made are saved so that users need not remake already made decisions, even when the data is refreshed.

Operation 620 indicates that a user can identify a set of records that a user would like to take offline to work with and edit, make decisions about, etc. The selected records can be displayed (622) and downloaded into a file 624 as indicated. In one example, the records are downloaded into a comma separated value file, a spreadsheet file or other file that can be edited offline (meaning outside the identity mapping system).

A user can subsequently import back into the system information that has been edited offline as indicated by operation 626. Upon selecting the appropriate user interface control (link, etc.) a page/dialog can be presented 628 that allows a user to identify and upload a file 630 that has been edited offline. Once the file is uploaded, the file can be validated and then stored in the database as indicated by 632.

Example Machine Architecture and Machine-Readable Medium

Figure 7:
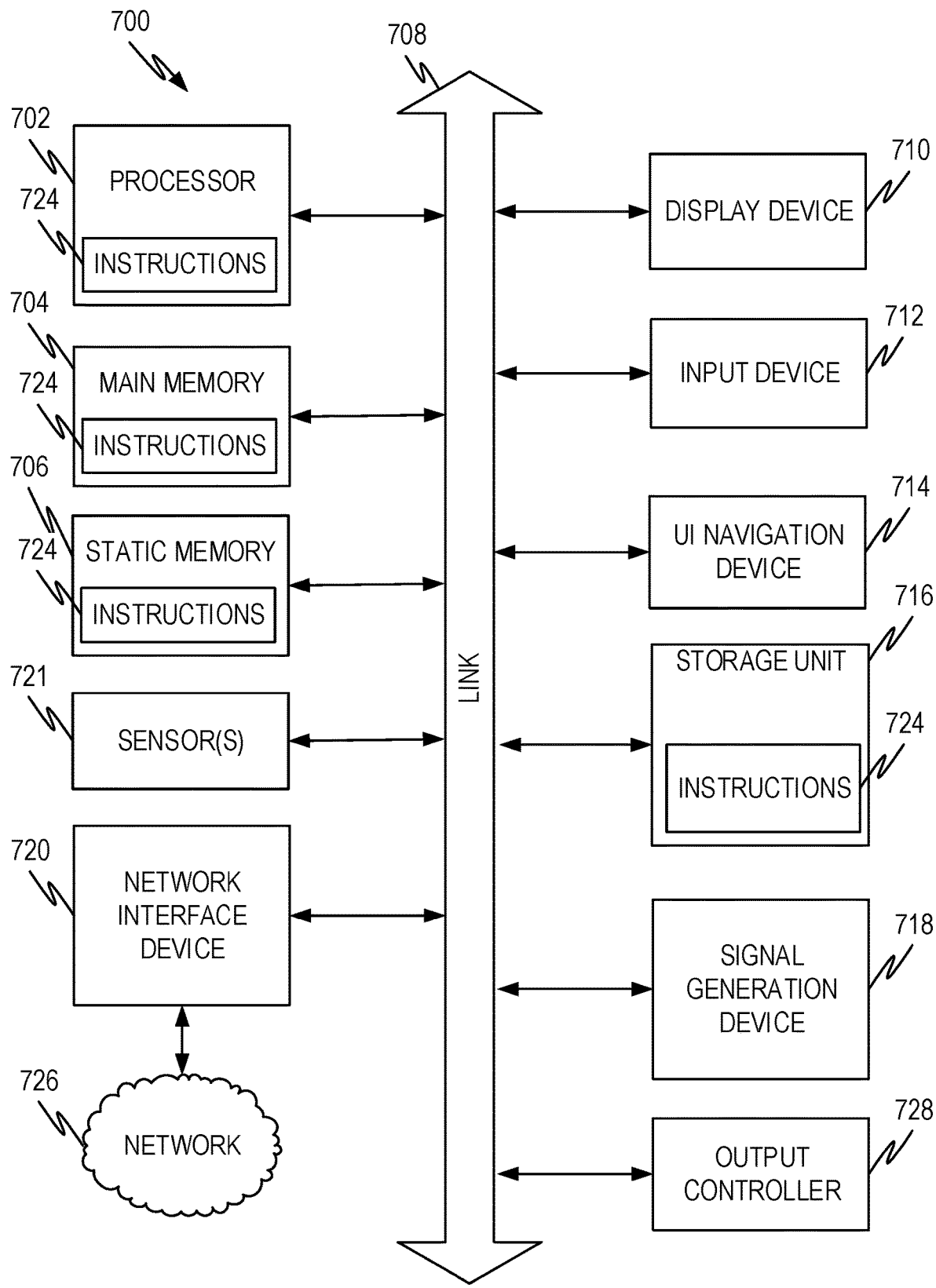
FIG. 7 illustrates a representative machine architecture suitable for implementing the systems and other aspects disclosed herein or for executing the methods disclosed herein.

FIG. 7 illustrates a representative machine architecture suitable for implementing the systems and so forth or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude media that consist of carrier waves, modulated data signals, and other such media, at least some of which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclo-

EXAMPLE EMBODIMENTS

Example 1

A method for migrating from an on premises system to a cloud based system, comprising:
collecting, from the on premises system, source application information comprising user profile information and data ownership information associated with a source application (204, 206);
collecting, from the on premises system, source identity information comprising user identity information associated with a source infrastructure (208, 210);
collecting, from the cloud based system, target identity information comprising user identity information associated with a target infrastructure (214, 216);
correlating the source application information or the source identity information or both to the target identity information to create a mapping of identities from the on premises system to the cloud based system (220);
presenting the mapping to a user via a user interface (222);
receiving from the user approval for the mapping;
responsive to the user approval, creating a plurality of migration files (226); and
initiating execution of a migration application that performs actual data migration based on the plurality of migration files.

Example 2

The method of example 1 further comprising storing, in an identity mapping data store, the source application information, the source identity information and the target identity information.

Example 3

The method of example 2 wherein the identity mapping data store comprises a database schema comprising:
a source application table;
a target identity table;
a source identity table; and
an identity table.

Example 4

The method of example 3 wherein the identity table comprises a plurality records each record related to an identity, each record comprising a plurality of fields related to the mapping.

Example 5

The method of example 4 wherein the fields comprise:
a first field indicating a unique identifier;
a second field indicating whether the associated identity has been correlated or not; and
a third field indicating whether the record has been acknowledged by an authorized user.

Example 6

The method of example 1, 2, 3, 4 or 5 further comprising:
receiving from the user acknowledgment of one or more identities in the mapping; and
maintaining a state indicating the acknowledgement of the one or more identities.

Example 7

The method of example 6 further comprising:
presenting the state of each identity in the mapping via the user interface so that the user knows whether each identity in the mapping has been acknowledged or not.

Example 8

The method of example 6 further comprising:
presenting identities that have not been acknowledged.

Example 9

The method of example 1 wherein the correlating operation comprises:
accessing an identity mapping data store containing the source identity information, the source application information and the target identity information;
retrieving an identity associated with at least one of the source identity information and the source application information;
determining whether a unique identifier associated with the identity is also associated with a target identity from the target identity information;
responsive to determining that the unique identifier is associated with both the identity and the target identity, correlating the identity and the target identity; and
responsive to determining that the unique identifier is not associated with any target identity, performing a further matching process to determine whether the identity correlates to any target identity.

Example 10

A system for migrating from an on premises system comprising a processor and computer executable instructions, that when executed by the processor, cause the system to perform operations comprising:
collecting, from the on premises system, source application information associated with a source application (204, 206) and storing the source application information in a source application table (302) in an identity mapping store (218);
collecting, from the on premises system, source identity information associated with a source infrastructure (208, 210) and storing the source identity information in a source identity table (314) in the identity mapping store (218);
collecting, from the cloud based system, target identity information comprising associated with a target infrastructure (214, 216) and storing the target identity information in a target identity table (306) in the identity mapping store (218);
correlating the source application information or the source identity information or both to the target identity information to create a mapping of identities (220) and storing the mapping in an identity table in the identity mapping store (218);

presenting the mapping to a user via a user interface (222, 600);
receiving from the user approval for the mapping (222);
responsive to the user approval, creating a plurality of migration files (226, 228); and
initiating execution of a migration application that performs actual data migration based on the plurality of migration files.

Example 11

The system of example 10 wherein:
the source application table comprises a plurality application information records, each record comprising:
a unique identifier field identifying a user associated with the application information record; and
a field identifying whether the user associated with the application information record owns data that is to be migrated;
the source identity table comprises a plurality source identity records, each source identity record comprising:
a unique identifier field identifying a user associated with the source identity information record; and
the target identity table comprises a plurality target identity records, each target identity record comprising:
a unique identifier field identifying a user associated with the target identity information record.

Example 12

The system of example 10 wherein the identity table comprises a plurality of identity records, each identity record comprising:
a unique identifier filed identifying a user associated with the identity record;
a mapping field indicating whether the identity record contains a correlated identity; and
an acknowledgement field indicating whether the identity record has been acknowledged by an authorized user.

Example 13

The system of example 12 wherein the identity table comprises a plurality records each record related to an identity, each record comprising a plurality of fields related to the mapping.

Example 14

The system of example 13 further comprising:
correlating at least one of an application information record and a source identity record;
setting the unique identity field in an identity record to the value of the unique identity field associated with the application information record or the source identity record;
setting the mapping filed of the identity record to indicate the record contains a correlated identity.

Example 15

The system of example 10, 11, 12, 13 or 14 further comprising:
receiving from the user acknowledgment of one or more identities in the mapping; and
maintaining a state indicating the acknowledgement of the one or more identities.

Example 16

The system of example 15 further comprising:
presenting the state of each identity in the mapping via the user interface so that the user knows whether each identity in the mapping has been acknowledged or not.

Example 17

The system of example 15 further comprising:
presenting identities that have not been acknowledged.

Example 18

The system of example 10 wherein the correlating operation comprises:
accessing the identity mapping data store containing the source identity information, the source application information and the target identity information;
retrieving an identity associated with at least one of the source identity information and the source application information;
determining whether a unique identifier associated with the identity is also associated with a target identity from the target identity information;
responsive to determining that the unique identifier is associated with both the identity and the target identity, correlating the identity and the target identity; and
responsive to determining that the unique identifier is not associated with any target identity, performing a further matching process to determine whether the identity correlates to any target identity.

Example 19

A computer storage medium comprising executable instructions that, when executed by a processor of a machine, cause the machine to perform operations comprising:
collecting, from the on premises system, source application information associated with a source application (204, 206) and storing the source application information in a source application table (302) in an identity mapping store (218);
collecting, from the on premises system, source identity information associated with a source infrastructure (208, 210) and storing the source identity information in a source identity table (314) in the identity mapping store (218);
collecting, from the cloud based system, target identity information comprising associated with a target infrastructure (214, 216) and storing the target identity information in a target identity table (306) in the identity mapping store (218);
correlating the source application information or the source identity information or both to the target identity information to create a mapping of identities (220) and storing the mapping in an identity table in the identity mapping store (218);
presenting the mapping to a user via a user interface (222, 600);
receiving from the user approval for the mapping (222);
responsive to the user approval, creating a plurality of migration files (226, 228); and
initiating execution of a migration application that performs actual data migration based on the plurality of migration files.

Example 20

The medium of example 19 wherein the correlating operation comprises:
accessing the identity mapping data store containing the source identity information, the source application information and the target identity information;
retrieving an identity associated with at least one of the source identity information and the source application information;
determining whether a unique identifier associated with the identity is also associated with a target identity from the target identity information;
responsive to determining that the unique identifier is associated with both the identity and the target identity, correlating the identity and the target identity; and
responsive to determining that the unique identifier is not associated with any target identity, performing a further matching process to determine whether the identity correlates to any target identity.

Example 21

A method for migrating from an on premises system comprising:
collecting, from the on premises system, source application information associated with a source application (204, 206) and storing the source application information in a source application table (302) in an identity mapping store (218);
collecting, from the on premises system, source identity information associated with a source infrastructure (208, 210) and storing the source identity information in a source identity table (314) in the identity mapping store (218);
collecting, from the cloud based system, target identity information comprising associated with a target infrastructure (214, 216) and storing the target identity information in a target identity table (306) in the identity mapping store (218);
correlating the source application information, or the source identity information or both to the target identity information to create a mapping of identities (220) and storing the mapping in an identity table in the identity mapping store (218);
presenting the mapping to a user via a user interface (222, 600);
receiving from the user approval for the mapping (222);
responsive to the user approval, creating a plurality of migration files (226, 228); and
initiating execution of a migration application that performs actual data migration based on the plurality of migration files.

Example 22

The method of example 21 wherein:
the source application table comprises a plurality application information records, each record comprising:
a unique identifier field identifying a user associated with the application information record; and
a field identifying whether the user associated with the application information record owns data that is to be migrated;
the source identity table comprises a plurality source identity records, each source identity record comprising:
a unique identifier field identifying a user associated with the source identity information record; and
the target identity table comprises a plurality target identity records, each target identity record comprising:
a unique identifier field identifying a user associated with the target identity information record.

Example 3

The method of example 21 or 22 wherein the identity table comprises a plurality of identity records, each identity record comprising:
a unique identifier filed identifying a user associated with the identity record;
a mapping field indicating whether the identity record contains a correlated identity; and
an acknowledgement field indicating whether the identity record has been acknowledged by an authorized user.

Example 24

The method of example 23 wherein the identity table comprises a plurality records each record related to an identity, each record comprising a plurality of fields related to the mapping.

Example 25

The method of example 24 further comprising:
correlating at least one of an application information record and a source identity record;
setting the unique identity field in an identity record to the value of the unique identity field associated with the application information record or the source identity record;
setting the mapping filed of the identity record to indicate the record contains a correlated identity.

Example 26

The method of example 21, 22, 23, 24 or 25 further comprising:
receiving from the user acknowledgment of one or more identities in the mapping; and
maintaining a state indicating the acknowledgement of the one or more identities.

Example 27

The method of example 26 further comprising:
presenting the state of each identity in the mapping via the user interface so that the user knows whether each identity in the mapping has been acknowledged or not.

Example 28

The method of example 26 further comprising:
presenting identities that have not been acknowledged.

Example 29

The method of example 21, 22, 23, 24, 25, 26, 27, or 28 wherein the correlating operation comprises:
accessing the identity mapping data store containing the source identity information, the source application information and the target identity information;
retrieving an identity associated with at least one of the source identity information and the source application information;

determining whether a unique identifier associated with the identity is also associated with a target identity from the target identity information;

responsive to determining that the unique identifier is associated with both the identity and the target identity, correlating the identity and the target identity; and responsive to determining that the unique identifier is not associated with any target identity, performing a further matching process to determine whether the identity correlates to any target identity.

Example 30

The method of example 29 wherein the further matching process comprises:

comparing a login name, a display name or a distinguished name to a user principle name or a group name; and responsive to determining that the login name, the display name or distinguished name matches the user principle name or the group name, correlating the identity and the target identity.

Example 31

The method of example 21, 22, 23, 24, 25, 26, 27, 28, 29, or 30 further comprising presenting to the user a total number of users and a total number of groups.

Example 32

The method of example 31 further comprising presenting to the user a number of unmapped users and a number of unmapped groups.

Example 33

The method of example 31 further comprising presenting to the user a number of unrationalized users and a number of unrationalized groups.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for migrating data from an on-premises system having a first security infrastructure to a cloud-based system having a second security infrastructure, comprising:

collecting, from the on-premises system, source application information comprising user profile information associated with a source application on the on-premises system and data ownership information associated with the source application;

collecting, from the on-premises system, source identity information comprising user identity information associated with the first security infrastructure of the on-premises system;

collecting, from the cloud-based system, target identity information comprising user identity information associated with the security infrastructure of the cloud-based system;

determining whether a unique ID exists for the source application and for the data ownership information, the unique ID correlating the source application information and the data ownership information;

determining that records for the source application and the data ownership information should be correlated when the unique ID does not exist;

correlating the source application information and the source identity information to the target identity information to create a mapping of identities from the on-premises system to the cloud-based system;

receiving user acknowledgment of one or more identities in the mapping;

maintaining a state indicating the acknowledgement of the one or more identities; and based on the mapping of identities, migrating data from the on-premises system to the cloud-based system.

2. The method of claim 1 further comprising storing, in an identity mapping data store, the source application information, the source identity information and the target identity information.

3. The method of claim 2 wherein the identity mapping data store comprises a database schema comprising:

a source application table;
a target identity table;
a source identity table; and
an identity table.

4. The method of claim 3 wherein the identity table comprises a plurality of records each record related to an identity, each record comprising a plurality of fields related to the mapping.

5. The method of claim 4 wherein the fields comprise:

a first field indicating a unique identifier;
a second field indicating whether the associated identity has been correlated or not; and
a third field indicating whether the record has been acknowledged by an authorized user.

6. The method of claim 1 further comprising:

presenting the state of each identity in the mapping via the user interface so that the user knows whether each identity in the mapping has been acknowledged or not.

7. The method of claim 1 further comprising:

presenting identities that have not been acknowledged.

8. The method of claim 1 wherein the correlating comprises:

accessing an identity mapping data store containing the source identity information, the source application information and the target identity information;

retrieving an identity associated with at least one of the source identity information and the source application information;

determining whether a unique identifier associated with the identity is also associated with a target identity from the target identity information;

responsive to determining that the unique identifier is associated with both the identity and the target identity, correlating the identity and the target identity; and
responsive to determining that the unique identifier is not associated with any target identity, performing a further matching process to determine whether the identity correlates to any target identity.

9. A system for migrating data from an on-premises system having a first security infrastructure, the system comprising a processor and computer executable instructions, that when executed by the processor, cause the system to perform operations comprising:
- collecting source application information associated with a source application from the on-premises system, and storing the source application information in a source application table in an identity mapping store;
- collecting source identity information associated with a source infrastructure from the on-premises system, and storing the source identity information in a source identity table in the identity mapping store;
- collecting target identity information associated with a target infrastructure from a cloud-based system having a second security infrastructure, and storing the target identity information in a target identity table in the identity mapping store;
- determining whether a unique ID exists for the source application and for the source identity information, the unique ID correlating the source application information and the source identity information;
- determining that records for the source application and the source identity information should be correlated when the unique ID does not exist;
- correlating the source application information and the source identity information to the target identity information to create a mapping of identities and storing the mapping in an identity table in the identity mapping store;
- receiving user acknowledgment of one or more identities in the mapping;
- maintaining a state indicating the acknowledgement of the one or more identities; and
- based on the mapping of identities, migrating data from the on-premises system to the cloud-based system.

10. The system of claim 9 wherein:
the source application table comprises a plurality of application information records, each record comprising:
  a unique identifier field identifying a user associated with the application information record; and
  a field identifying whether the user associated with the application information record owns data that is to be migrated;
the source identity table comprises a plurality of source identity records, each source identity record comprising:
  a unique identifier field identifying a user associated with the source identity information record; and
the target identity table comprises a plurality of target identity records, each target identity record comprising:
  a unique identifier field identifying a user associated with the target identity information record.

11. The system of claim 9 wherein the identity table comprises a plurality of identity records, each identity record comprising:
  a unique identifier filed identifying a user associated with the identity record;
  a mapping field indicating whether the identity record contains a correlated identity; and
  an acknowledgement field indicating whether the identity record has been acknowledged by an authorized user.

12. The system of claim 11 wherein the identity table comprises a plurality of records, each record related to an identity, each record comprising a plurality of fields related to the mapping.

13. The system of claim 12 further comprising:
- correlating at least one of an application information record and a source identity record;
- setting a unique identity field in an identity record to the value of the unique identity field associated with the application information record or the source identity record; and
- setting the mapping field of the identity record to indicate the record contains a correlated identity.

14. The system of claim 9 further comprising:
presenting the state of each identity in the mapping via a user interface to indicate whether each identity in the mapping has been acknowledged.

15. The system of claim 9 further comprising:
presenting identities that have not been acknowledged.

16. The system of claim 9 wherein the correlating comprises:
- accessing the identity mapping store containing the source identity information, the source application information and the target identity information;
- retrieving an identity associated with at least one of the source identity information and the source application information;
- determining whether a unique identifier associated with the identity is also associated with a target identity from the target identity information;
- responsive to determining that the unique identifier is associated with both the identity and the target identity, correlating the identity and the target identity; and
- responsive to determining that the unique identifier is not associated with any target identity, performing a further matching process to determine whether the identity correlates to any target identity.

17. A computer storage medium comprising executable instructions that, when executed by a processor of a machine, cause the machine to perform operations comprising:
- collecting source application information associated with a source application from an on-premises system having a first security infrastructure using a first data collector tailored to collect source application information, and storing the source application information in a source application table in an identity mapping store;
- collecting source identity information associated with a source infrastructure from the on-premises system using a second data collector tailored to collect source identity information, and storing the source identity information in a source identity table in the identity mapping store;
- collecting target identity information associated with a target infrastructure from a cloud-based premises system having a second security infrastructure using a third data collector tailored to collect source application information, and storing the target identity information in a target identity table in the identity mapping store;
- determining whether a unique ID exists for the source application and for the source identity information, the unique ID correlating the source application information and the source identity information;

determining that records for the source application and the source identity information should be correlated when the unique ID does not exist;

correlating the source application information and the source identity information to the target identity information to create a mapping of identities and storing the mapping in an identity table in the identity mapping store;

receiving user acknowledgment of one or more identities in the mapping;

maintaining a state indicating the acknowledgement of the one or more identities; and based on the mapping of identities, migrating data from the on-premises system to the cloud-based system.

18. The medium of claim 17 wherein the correlating comprises:

accessing the identity mapping store containing the source identity information, the source application information and the target identity information;

retrieving an identity associated with at least one of the source identity information and the source application information;

determining whether a unique identifier associated with the identity is also associated with a target identity from the target identity information;

responsive to determining that the unique identifier is associated with both the identity and the target identity, correlating the identity and the target identity; and responsive to determining that the unique identifier is not associated with any target identity, performing a further matching process to determine whether the identity correlates to any target identity.

* * * * *